United States Patent [19]

Onda et al.

[11] Patent Number: 4,632,070

[45] Date of Patent: Dec. 30, 1986

[54] DEVICE FOR COOLING ENGINE POWER UNIT

[75] Inventors: Takanori Onda; Hitoshi Yamamoto; Masahiko Kimoto, all of Saitama, Japan

[73] Assignee: Honda Giken Kogyo Kabushiki Kaisha, Tokyo, Japan

[21] Appl. No.: 807,557

[22] Filed: Dec. 11, 1985

[30] Foreign Application Priority Data

Dec. 19, 1984 [JP] Japan .................. 59-267776

[51] Int. Cl.$^4$ .............................................. F01P 1/06
[52] U.S. Cl. .............................. 123/41.58; 123/41.66; 123/41.7; 180/229
[58] Field of Search ................ 123/41.58, 41.65, 41.66, 123/41.7; 180/229, 68.1, 68.2

[56] References Cited

U.S. PATENT DOCUMENTS

| | | | |
|---|---|---|---|
| 3,994,067 | 11/1976 | Hazzard et al. | 123/41.7 |
| 4,483,279 | 11/1984 | Köhler et al. | 123/41.65 |
| 4,494,490 | 1/1985 | Kiyooka et al. | 123/41.7 |
| 4,497,285 | 2/1985 | Kondo | 180/229 |
| 4,531,928 | 7/1985 | Ikenoya | 180/229 |
| 4,546,843 | 10/1985 | Koinuma et al. | 180/229 |

Primary Examiner—William A. Cuchlinski, Jr.
Attorney, Agent, or Firm—Sughrue, Mion, Zinn, Macpeak, and Seas

[57] ABSTRACT

A device for cooling both a belt casing of an engine and the engine itself, in which both the inside and the outside of the belt casing are cooled by exterior air which is sucked in by respective fans. The air which cools the outside of the belt casing also is used to cool the rest of the engine, and then exits the engine at a side opposite the side at which the air first was sucked in. As a result, air flow through the engine does not impede rotation of the fans and hence does not hamper the cooling process.

5 Claims, 3 Drawing Figures

DEVICE FOR COOLING ENGINE POWER UNIT

BACKGROUND OF THE INVENTION

The present invention relates to a device for cooling an engine power unit, and particularly to a cooling device suitable for use for an engine power unit which is provided with a friction type driving force transmission mechanism and which requires compulsory cooling.

Generally, for example, as shown in FIG. 1, an engine power unit 2 mounted on a scooter 1 is covered at its front portion 5 (forward portion in the running direction) or at its outer circumference with a frame cover 3 or the like. As the result, air remains in portions around an engine 4 of the power unit 2 so as to lower the efficiency in cooling the engine 4. Accordingly, means has been provided for compulsorily sending cooling air to the engine 4.

On the other hand, a friction type driving force transmission mechanism is mainly employed as a mechanism for transmitting driving force (for example, a speed change gear) used for the power unit 2 of the above-mentioned scooter 1.

In the case in which the friction type driving force transmission mechanism is employed, however, heat is generated among elements of the mechanism, thereby affecting significantly the efficiency in power transmission or the endurance of the mechanism, so that cooling becomes necessary. The cooling requirement has become more important as engines have become more powerful.

In FIG. 2, a conventional engine cooling system is shown in which a shroud 6 surrounding an engine 4 is provided on one side portion of the engine 4 along the longitudinal direction of a crank-shaft 5. A first exterior air inlet 7 is formed in the shroud 6 at a position opposite to an end of the crank-shaft 5, a first fan 8 for sucking exterior air through the first exterior air inlet 7 being attached at an end of the crank-shaft 5. A driving force transmission mechanism cooling system also is shown in which a belt casing 12 housing a driving force transmission mechanism 11 constituted by a pulley 9 attached on the crank-shaft 5 and a belt 10 hung about the pulley 9 is disposed on a side of the engine 4 opposite the shroud 6. A second exterior air inlet 13 is formed in the belt casing 12 opposite to the pulley 9, a second fan 14 for sucking exterior air into the belt casing 12 through the second exterior air inlet 13 being attached on the pulley 9 on a surface thereof opposite inlet 13.

In this engine cooling system, after the exterior air sucked by the first fan 8 has touched the outer surface of the engine 4 to exchange heat, the air is discharged to the exterior through a gap between the engine 4 and the shroud 6, however, the cooling air flows mainly in the direction shown by arrows in FIG. 2, that is, in the direction opposite to the first fan 8, so that the above-mentioned discharging portions are concentrated near the belt casing 12 and a gas, which has a high temperature after heat exchanged, touches the outer surface of the belt casing 12. As a result, cooling efficiency of the driving force transmission mechanism cooling system may be lowered because the outer surface of the belt casing 12 is heated.

SUMMARY OF THE INVENTION

It is therefore an object of the present invention to provide a device for cooling an engine power unit in which the foregoing problem in the prior art is effectively solved.

In order to attain the above-mentioned object, according to the aspect of the present invention, the engine power unit cooling device comprises a pulley disposed to be rotated by an output shaft of an engine, a belt hung about the pulley for transmitting a driving force of the engine, a belt casing provided at one side of the engine for housing the pulley and the belt, a shroud covering the belt casing and the engine, an exterior air inlet formed in the shroud at a position opposite to the pulley with the belt casing disposed therebetween, a partition wall provided between the exterior air inlet and the pulley and forming a part of the belt casing and dividing the exterior air inlet, thereby making the exterior air inlet communicate with the outside as well as the inside of the belt casing, a first fan provided on said partition wall at one side thereof opposite to the shroud for sending exterior air to the outside of the belt casing, and a second fan provided on the partition wall at the other side thereof opposite to the belt casing for sending exterior air to the inside of the belt casing, the first and second fans being connected to the output shaft.

According to the present invention, the cooling air inlets for the driving force transmission mechanism are concentrated at one side of the power unit and the engine cooling air is caused to flow to the engine through the belt casing, so that cooling efficiency can improve overall.

DETAILED DESCRIPTION OF THE PREFERRED EMBODIMENT

Figure 1:
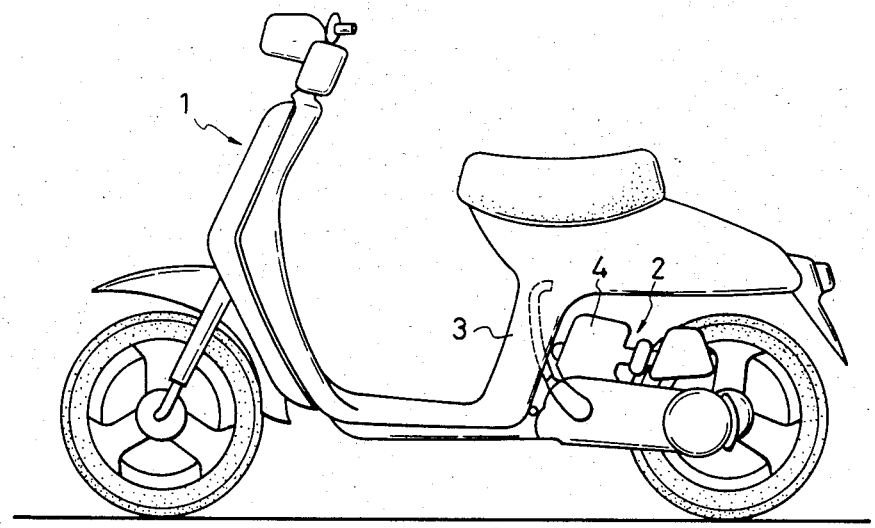
FIG. 1 is a side view showing an example of a scooter on which a power unit is mounted.
Figure 2:
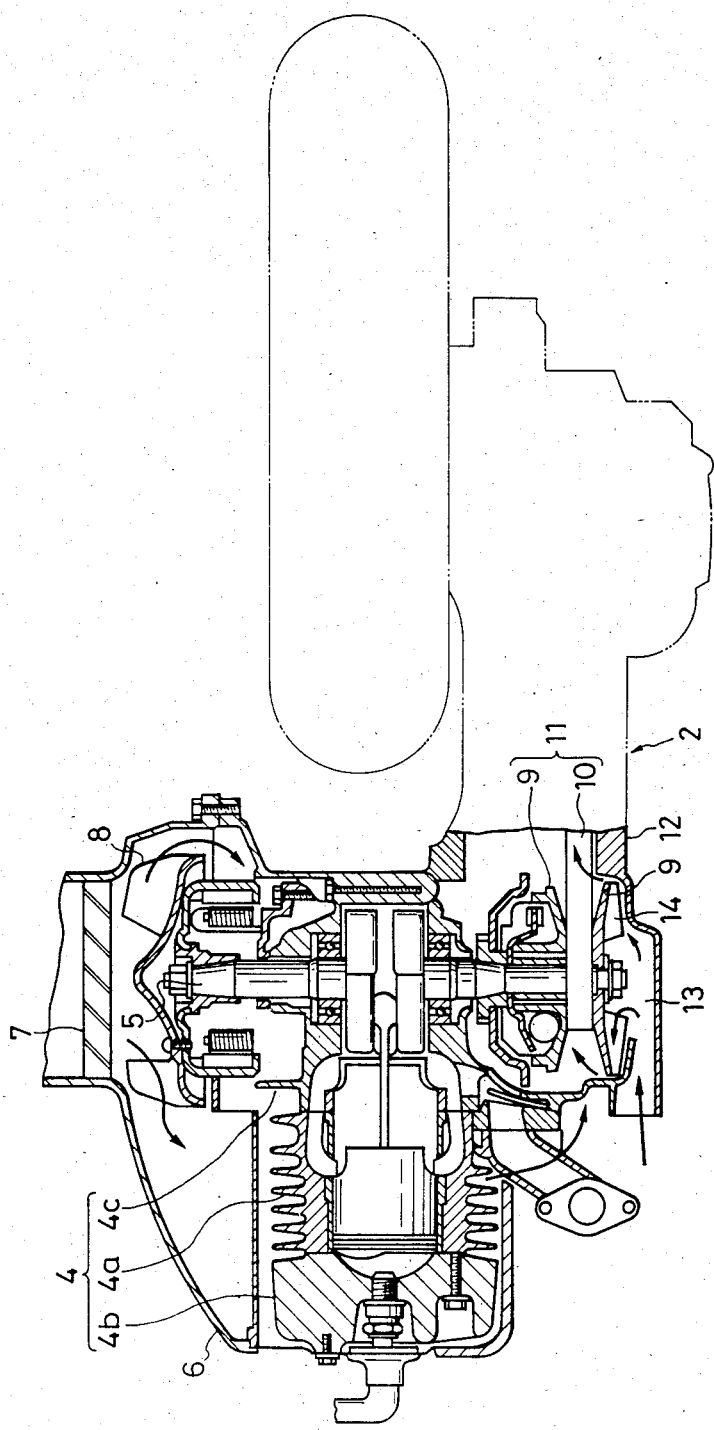
FIG. 2 is a partly cross-sectioned plan view showing a main part of an example of the conventional power unit.
Figure 3:
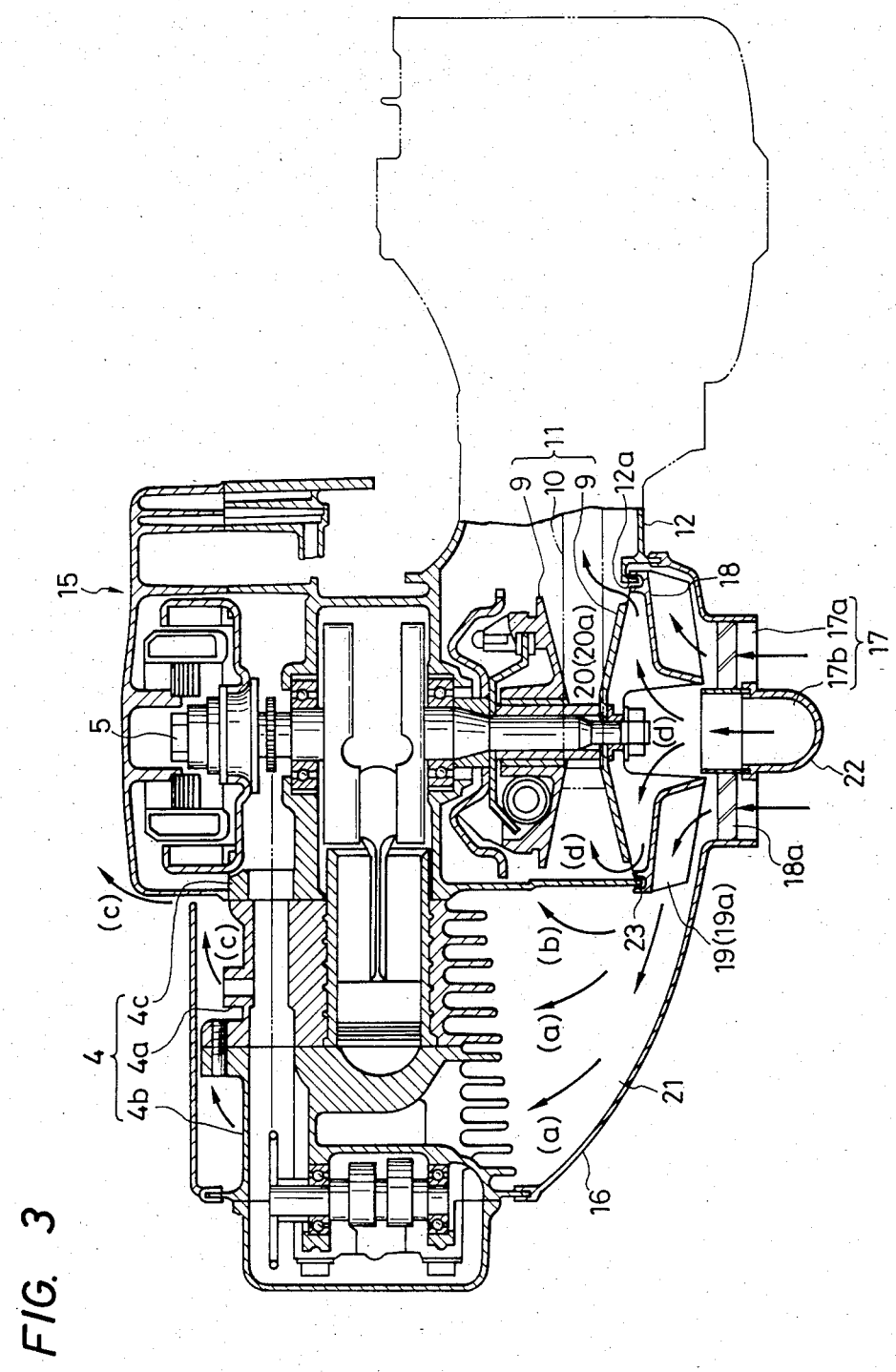
FIG. 3 is a partly cross-sectioned plan view showing a main part of an embodiment according to the present invention.

Referring to FIG. 3, a preferred embodiment of the present invention now will be described. In this description, elements identical to those in FIGS. 1 and 2 are correspondingly numbered and their explanation is omitted.

In FIG. 3 the reference number 15 designates a power unit to which the present invention is applied. The cooling device applied to the power unit 15 has a belt casing 12 housing a driving force transmission mechanism 11 provided with a pulley 9. A belt 10 is provided at one side of an engine 4, and a shroud 16 is provided to cover the belt casing 12 and the engine 4. An exterior air inlet 17 is formed in the shroud 16 at a position opposite the pulley 9, with the belt casing 12 disposed therebetween. A partition wall 18 is provided between the exterior air inlet and the pulley, the partition wall 18 being a part of the belt casing 12 and dividing the exterior air inlet 17, thereby making the exterior air inlet communicate with the outside as well as the inside of the belt casing 12.

A first fan 19 is provided on one side of the partition wall 18 opposite to the shroud 16 for sending exterior air to the outside of the belt casing 12, and a second fan 20 is provided on the other side of the partition wall 18 opposite to the belt casing 12 for sending exterior air to the inside of the belt casing 12, the first and second fans 19 and 20 being connected to a crank-shaft which is the output shaft of the engine 4.

The arrangement described above now will be explained in detail. The shroud 16 surrounds a cylinder block 4a as well as a cylinder head 4b of the engine 4. The shroud 16 also surrounds the belt casing 12 at the outer circumference of the connecting portion between the belt casing 12 and a crank casing 4c of the engine 4, so as to form an outer path 21 for exterior air in cooperation with the outer surfaces of the engine 4 and the belt casing 12.

In the embodiment, the exterior air inlet 17 is divided into first and second exterior air inlets 17a and 17b by an exterior air lead-in pile 22 arranged substantially coaxially with the crank-shaft 5.

The partition wall 18 is arranged to cover through holes 12a formed in the belt casing 12 at positions opposite to the pulley 9. A labyrinth seal 23 is provided at the circumferential edge of the partition wall 18 so as to prevent a gas from passing through a gap between the partition wall 18 and the belt casing 12 while allowing relative movement between the partition wall 18 and the belt casing 12. A throttle portion 18a continued to the exterior air lead-in pipe 22 is formed at the center portion of the partition wall 18. Thus, the partition wall 18 couples the wall of the belt casing 12 with the wall of the exterior air lead-in pipe 22 so that the first exterior air inlet 17a is communicated with the inside of the belt casing 12.

The first fan 19 is of the centrifugal type and is constituted by a number of vanes 19a integrally formed on the surface of the partition wall 18 at one side thereof opposite to the first exterior inlet 17a.

The second fan 20 is also of the same centrifugal type as the first fan 19 and is constituted by a number of vanes 20a integrally formed on the surface of the partition wall 18 at the other side thereof.

The vanes 20a of the second fan 20 are integrally attached to the pulley 9 so that the partition wall 18 and the first fan 19 are connected with the crank-shaft 5 through the pulley 9 to thereby rotate integrally with the second fan 20.

In the cooling device thus arranged, when the engine 4 is started, the crank-shaft 5 rotates to drive the first and the second fans 19 and 20, thereby starting the cooling operation.

That is, exterior air is sucked through the exterior air inlet 17, because of the rotation of the first and the second fans 19 and 20. In particular, a part of the air sucked through the first exterior air inlet 17a is led to directly touch the cylinder head 4b and the cylinder block 4a through the first fan 19 as shown by the arrows (a) in FIG. 3. The remainder of the air sucked through the first exterior air inlet 17a is led to touch the outer surface of the belt casing 12 as shown by arrows (b) in FIG. 3 and then is sent to the engine 4, thereby cooling the belt casing 12 as well as the engine 4. After being used for cooling as described above, the air is discharged to the exterior through the gap between the engine 4 and the shroud 16 mainly at a portion thereof at the side opposite to the air suction side, as indicated by the arrow (c).

On the other hand, the air sucked through the second exterior air inlet 17b is sent into the inside of the belt casing 12 through the throttle 18a of the partition wall 18 and the second fan 20 to thereby cool the belt casing 12 from the inside thereof and is caused to touch the pulley 9 and the belt 10 to cool the,, as indicated by the arrows (d). The air which has finished heat exchange with the belt casing 12, the pulley 9, and the belt 10 is discharged to the exterior through a gap (not shown) of the belt casing 12.

In such a cooling operation, the belt casing 12 is cooled more effectively because both its outer and its inner surfaces are cooled. Although the air which has been used to cool the belt casing 12 from the outer side is further used to exchange heat with the engine 4 still is possible because the temperature of the belt casing 12 is lower than that of the engine 4. Thus, the cooling operation can be performed efficiently.

In the embodiment, the pulley 9, the second fan 20, and the partition wall 18 are made integral with each other, so that it is possible to minimize the difference in speed between the air flow in the vicinity of the pulley 9 and the partition wall 18 and the air flow at the center portion of the vanes 20a of the second fan 20, thereby smoothing the air flow in the second fan 20 so as to raise the cooling efficiency also owing to this point. Further, the first fan 19 also is made integral with the pulley 9, the second fan 20, and the partition wall 18, so that the cooling device can be made compact to miniaturize the unit as a whole.

On the other had, the respective main portions of the cooling system for the engine 4 and the cooling system for the driving force transmission mechanism 11, that is, the exterior air inlets 17a and 17b and the fans 19 and 20 are in the same general area, to facilitate maintenance and inspection of the device.

The shapes, the dimensions, etc., of the constituent members shown in the above-mentioned embodiment are shown merely by way of example and can be changed depending on design requirements for the power unit to which the present invention is applied. For example, the respective vanes 19a and 20a of the first and the second fans 19 and 20 may be separated from the partition wall 18 while the partition wall 18 is made integral with the belt casing 12, or the exterior air inlets 17a and 17b may be combined into one.

As described above, in the device for cooling the power unit, the efficiency of cooling the belt casing can be raised by cooling the casing from both its inside and its outside, and the efficiency of cooling the whole unit can be raised by making the cooling air touch the engine after the cooling air used to cool the belt casing whose temperature is lower than the engine temperature. Further, maintenance and inspection of the device can be facilitated because of the arrangement in which the main portions of the cooling device are positioned in the same general area.

What is claimed is:

1. A device for cooling a power unit, comprising:
 a pulley arranged to be rotated by an output shaft of an engine;
 a belt hung about said pulley for transmitting a driving force of said engine;
 a belt casing provided at one side of said engine for housing said pulley and said belt;
 a shroud for covering said belt casing and said engine;
 an exterior air inlet formed in said shroud opposite said pulley with said belt casing disposed between exterior air inlet and said pulley;
 said belt casing including a partition wall provided between said exterior air inlet and said pulley to divide said exterior air inlet whereby said exterior air inlet communicates with both the outside and inside of said belt casing;

a first fan provided on one side of said partition wall opposite said shroud for sending exterior air to the outside of said belt casing; and a second fan provided on the other side of said partition wall opposite said belt casing for sending exterior air to the inside of said belt casing, said first and second fans being connected to said output shaft.

2. A device as claimed in claim 1, wherein said pulley, said second fan, and said partition wall are made integral with each other.

3. A device as claimed in claim 1, wherein said pulley, said first and second fans, and said partition wall are made integral with each other.

4. A devide as claimed in claim 1, further comprising an exterior air lead-in pile for dividing said exterior air inlet into first and second inlets, whereby air passes through said first inlet to cool the outside of said belt casing, and through said second inlet to cool the inside of said belt casing.

5. A device as claimed in claim 4, wherein air passing through said first inlet cools said engine after cooling the outside of said belt casing and then exits said engine through a slot between said engine and said shroud at a side of said engine opposite said first inlet.

* * * * *